United States Patent
Numata

(10) Patent No.: US 8,020,048 B2
(45) Date of Patent: Sep. 13, 2011

(54) POWER-ON SELF TEST PROGRAM MANAGEMENT APPARATUS AND ITS MANAGEMENT METHOD AND PROGRAM

(75) Inventor: Michio Numata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 435 days.

(21) Appl. No.: 12/181,395

(22) Filed: Jul. 29, 2008

(65) Prior Publication Data

US 2008/0288824 A1 Nov. 20, 2008

Related U.S. Application Data

(63) Continuation of application No. PCT/JP2006/303461, filed on Feb. 24, 2006.

(51) Int. Cl.
*G06F 11/00* (2006.01)
(52) U.S. Cl. ......................................................... 714/54
(58) Field of Classification Search .................... 714/36, 714/54
See application file for complete search history.

(56) References Cited

U.S. PATENT DOCUMENTS

| 5,878,256 A * | 3/1999 | Bealkowski et al. ............ 713/2 |
| 6,684,343 B1 * | 1/2004 | Bouchier et al. ................ 714/4 |
| 2003/0106051 A1 | 6/2003 | Morrison et al. ............. 717/170 |

FOREIGN PATENT DOCUMENTS

| JP | 10-143358 | 5/1998 |
| JP | 2001-306307 | 11/2001 |
| JP | 2002-14939 | 1/2002 |
| JP | 2003-015895 | 1/2003 |
| JP | 2003-15895 | 1/2003 |
| JP | 2003-196105 | 7/2003 |
| JP | 2003-323298 | 11/2003 |

OTHER PUBLICATIONS

Operation Guide to Hardware Management Console for EP8000 (8 pages including translation).
International Search Report dated Mar. 14, 2006 in corresponding International Application No. PCT/JP2006/303461 (14 pages).
EP800-yo Hardware Management Console Operation Guide 5555-10-015, first edition, Hitachi, Ltd. Enterprise Server Jigyobu, 2002 (8 pages).
International Preliminary Report on Patentability, mailed Aug. 26, 2008, in corresponding International Application No. PCT/JP2006/303461 (10 pages).

* cited by examiner

*Primary Examiner* — Scott Baderman
*Assistant Examiner* — Yair Leibovich
(74) *Attorney, Agent, or Firm* — Staas & Halsey LLP

(57) ABSTRACT

A POST management apparatus for managing a POST of an SB in a partition which operates in units of an OS using the CPU of the SB as a resource accesses the storage area storing the POST of the SB so as to perform read/write operation and to acquire/recognize the individual information on the SB and the version number information of the POST, transmits the POST of a predetermined version number according to at least one of the individual information and the version number information, and manages the version number of the POST so that the version numbers of the POSTs used in the SBs in units of a partition coincide with each other.

15 Claims, 15 Drawing Sheets

POWER-ON SELF TEST PROGRAM MANAGEMENT APPARATUS AND ITS MANAGEMENT METHOD AND PROGRAM

This application is a continuation of International Application No. PCT/JP2006/303461, filed Feb. 24, 2006, the disclosure of which is herein incorporated in its entirety by reference.

TECHNICAL FIELD

The present invention relates to a power-on self test program management apparatus, and its management method and program and, more particularly, to a power-on self test program management apparatus that is applied to a computer system including a plurality of partitions each constituted by system boards (SBs) and includes a control service processor (SP) for managing the entire system or partitions independently of the partitions and is configured to automatically update the version number of a power-on self test program (POST) on each SB to the version number registered in the control service processor and maintains the updated version number and its management method and program.

The power-on self test program is a program for diagnosing presence/absence of a failure in a system at the start-up time of the system when the system has been turned power-on and the system has been reset.

BACKGROUND ART

FIG. 15 is a block diagram showing a conventional system to which a POST is applied. In FIG. 15, the system includes partitions #0 and #1. The partition #0 is constituted by SB #0 and SB #1 which are POST diagnosis targets. Similarly, the partition #1 is constituted by SB #2 and SB #3. Further, the system of FIG. 15 includes an SP (control service processor) 1 that controls the entire system constituted by the partitions and SBs.

The SBs #0 to #3 each include a CPU 2, an FMEM (Flash Memory) 3 for storing a POST, a bus switch SC/XB 6 of a system bus for connecting to another SB in the same partitions so as to allow the respective SBs to work in a collaborative manner, and an I/F section 4 serving as an interface with the SP 1.

Each of the partitions #0 and #1, is constituted by combining resources (CPU and the like) in one or more SBs constituting the database or server and a unit providing an environment where its own OS runs.

The SP 1 is connected to the SBs #0 to #3, respectively, through the system control bus and I/F sections 4 of the SBs. In the example of FIG. 15, the SP 1 has a redundant configuration with two SPs #0 and #1, each of which has a CPU 8 and is configured to be able to operate according to a program stored in an FMEM 7. In each SB, the CPU 2 can directly access the I/F section 4 and FMEM 3.

The conventional operation performed in this system will be described below. At normal operation time, the Master-side SP 1 controls the entire system. At maintenance time, control of the system is transferred from the Master-side to slave-side SP1. The POST becomes effective only after the POST is registered in a given partition and the partition is restarted. In a conventional configuration, the CPU 2 on the partitions #0 and #1 rewrites the POST into the FMEM 3 and restarts the partition.

As described above, the SBs #0 to #3 each include the FMEM 3, which is a rewritable memory, in which the POST with a default version number has been written. In the case where the version number of the POST that has been written in the SB differs from the original one for the reason that the SB is replaced with a new one due to a failure or an additional SB is installed, inconsistency occurs between the SBs in the same partition.

In order to prevent occurrence of the inconsistency, the following approach has been taken. That is, whether or not a POST of the same version number has been written in a new SB is confirmed before replacement and, in the case where a POST of a different version number has been written on the new SB, a POST of the same version number is written on the FMEM on the new SB after start-up of the system so that the version numbers of the POSTs used in the SBs in the same partition coincide with each other.

As a technique relevant to the present invention, there is known a technique in which a POST is written from the control service processor to a resource on the CPU side so as to increase the start-up speed of the POST (refer to, e.g., Patent Document 1).

Patent Document 1: Japanese Laid-Open Patent Publication No. 05-265766

DISCLOSURE OF THE INVENTION

Problems to be Solved by the Invention

However, the prior art has the following disadvantages. (1) At the time when the SB is replaced with now one or an additional SB is installed, the POST needs to be rewritten after start-up of the system, increasing a time required for the replacement work. (2) POSTs of different version numbers temporarily exist together immediately after the system is started-up for rewrite of the POST, with the result that the system cannot operate properly depending on the changes of firmware. (3) In a system capable of supporting a plurality of partitions, generation management of the POST needs to be performed in accordance with the number of partitions. Therefore, it is necessary to secure a program area corresponding to the number of partitions in a service processor section provided independently of the SB, or it is necessary to limit the number of times of update of the version number.

The present invention has been made to solve the above problems, and an object thereof is to provide a power-on self test program management apparatus and its management method and program, allowing quick and easy replacement work of the POST and easy management of the POST.

Means for Solving the Problems

To solve the above problems, according to the first aspect of the present invention, there is provided a power-on self test program management apparatus for managing a power-on self test program of a system board in a partition which operates in units of OS using a CPU of the system board as a resource, comprising: an access section that can access the storage area storing the power-on self test program of the system board to perform read/write operation; an individual information acquisition section that acquires the individual information of the system board provided in the partition; a version number information recognition section that recognizes the version number information of the power-on self test program used in the partition; and a version number management section that transfers a power-on self test program of a predetermined version number to the storage area of the system board accessed by the access section according to at least one of the individual information acquired by the individual information acquisition section and version number information recognized by the version number information recognition section and manages the version number of the power-on self test program so that the version numbers of the power-on self test programs used in the system boards in units of a partition coincide with each other.

The power-on self test program management apparatus according to the present invention comprises a registration section that performs registration of the power-on self test program, wherein when the version number management section determines execution of initial registration processing for the system board constituting the partition based on the individual information acquired by the individual information acquisition section, it transfers the power-on self test program for update registered in the registration section to the storage area of the system board.

In the power-on self test program management apparatus according to the present invention, the version number management section determines addition of a new system board based on the individual information acquired by the individual information acquisition section and, when determining that the version number of the power-on self test program used in the partition to which the new system board is to be added is different from the version number of the power-on self test program registered in the version number management section itself based on the version number information recognized by the version number information recognition section, causes the access section to read out the power-on self test program stored in the storage area of the existing system board and transfers the read out power-on self test program to the new system board.

The power-on self test program management apparatus according to the present invention comprises a failure information acquisition section that acquires the failure information indicating that a failure occurs in a given system board, wherein the version number management section causes the access section to read out the power-on self test program from a failed system board based on the failure information acquired by the failure information acquisition section and individual information acquired by the individual information acquisition section and transfers the read out power-on self test program to a new system board with which the failed system board has been replaced.

In the power-on self test program management apparatus according to the present invention, the version number management section manages the downtime of a plurality of partitions and performs update of the power-on self test programs used in the system boards of the respective partitions at the partition downtime.

In the power-on self test program management apparatus according to the present invention, when the version number management section determines that there are a plurality of system boards to which the power-on self test program is to be transferred based on the individual information acquired by the individual information acquisition section, it transfers the power-on self test program in a broadcast manner.

Further, according to a second aspect of the present invention, there is provided a power-on self test program management method for managing, by using a computer, a power-on self test program of a system board in a partition which operates in units of OS using a CPU of the system board as a resource, comprising: an access step that can access the storage area storing the power-on self test program of the system board to perform read/write operation; an individual information acquisition step that acquires the individual information of the system board provided in the partition; a version number information recognition step that recognizes the version number information of the power-on self test program used in the partition; and a version number management step that transfers a power-on self test program of a predetermined version number to the storage area of the system board accessed in the access step according to at least one of the individual information acquired in the individual information acquisition step and version number information recognized in the version number information recognition step and manages the version number of the power-on self test program so that the version numbers of the power-on self test programs used in the system boards in units of a partition coincide with each other.

The power-on self test program management method according to the present invention comprises a registration step that performs registration of the power-on self test program, wherein when the version number management step determines execution of initial registration processing for the system board constituting the partition based on the individual information acquired in the individual information acquisition step, it transfers the power-on self test program for update registered in the registration step to the storage area of the system board.

In the power-on self test program management method according to the present invention, the version number management step determines addition of a new system board based on the individual information acquired in the individual information acquisition step and, when determining that the version number of the power-on self test program used in the partition to which the new system board is to be added is different from the version number of the power-on self test program registered in the version number management step based on the version number information recognized in the version number information recognition step, the access step reads out the power-on self test program stored in the storage area of the existing system board and the version number management step transfers the read out power-on self test program to the new system board.

The power-on self test program management method according to the present invention comprises a failure information acquisition step that acquires the failure information indicating that a failure occurs in a given system board, wherein the version number management step causes the access section to read out the power-on self test program from a failed system board based on the failure information acquired in the failure information acquisition step and individual information acquired in the individual information acquisition step and transfers the read out power-on self test program to a new system board with which the failed system board has been replaced.

In the power-on self test program management method according to the present invention, the version number management step manages the downtime of a plurality of partitions and performs update of the power-on self test programs used in the system boards of the respective partitions at the partition downtime.

In the power-on self test program management method according to the present invention, when the version number management step determines that there are a plurality of system boards to which the power-on self test program is to be transferred based on the individual information acquired in the individual information acquisition step, it transfers the power-on self test program in a broadcast manner.

Further, according to a third aspect of the present invention, there is provided a power-on self test program management program allowing a computer to manage a power-on self test program of a system board in a partition which operates in units of OS using a CPU of the system board as a resource, the program allowing the computer to execute: an access step that can access the storage area storing the power-on self test program of the system board to perform read/write operation; an individual information acquisition step that acquires the individual information of the system board provided in the partition; a version number information recognition step that recognizes the version number information of the power-on self test program used in the partition; and a version number management step that transfers a power-on self test program of a predetermined version number to the storage area of the system board accessed in the access step according to at least one of the individual information acquired in the individual information acquisition step and version number information recognized in the version number information recognition step and manages the version number of the power-on self test program so that the version numbers of the power-on self test programs used in the system boards in units of a partition coincide with each other.

BEST MODE FOR CARRYING OUT THE INVENTION

An embodiment of the present invention will be described below with reference to the accompanying drawings.

Figure 1:
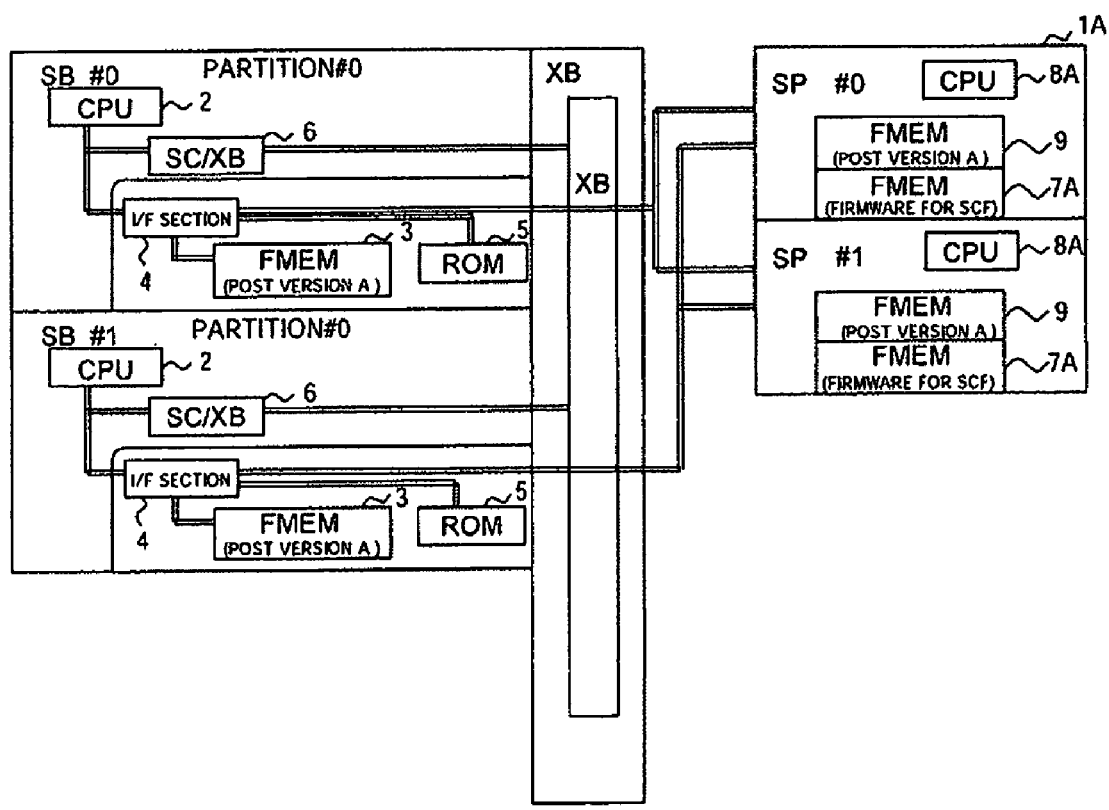
FIG. 1 is a block diagram showing the entire configuration of a system according to an embodiment of the present invention.
Figure 2:
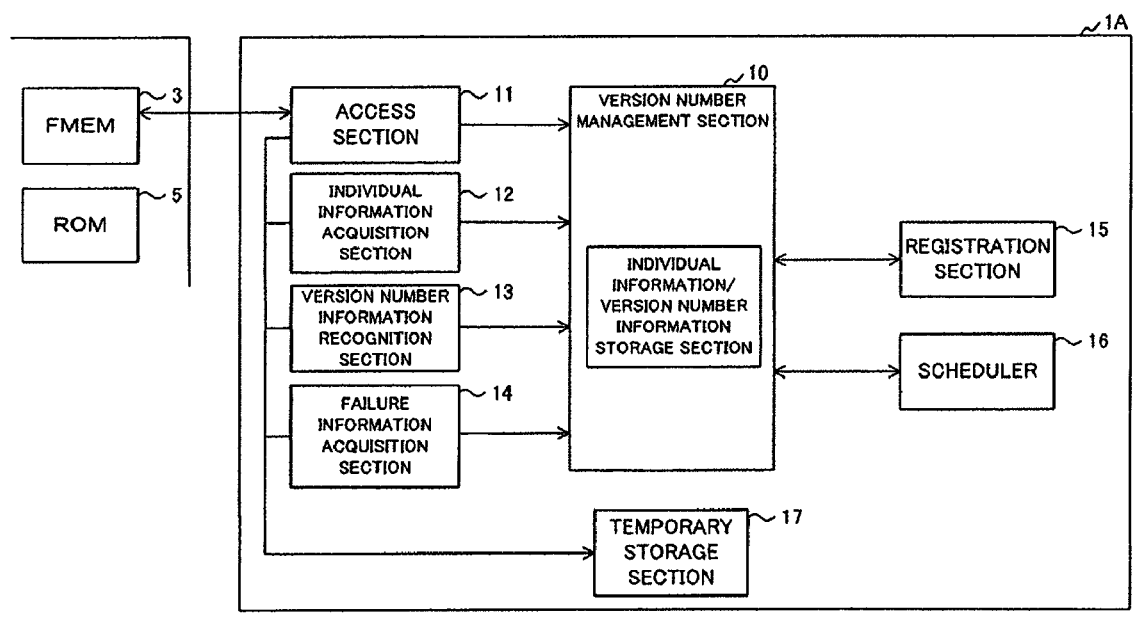
FIG. 2 is a block diagram showing the main part of an SP constituting a POST management apparatus according to the present invention.
Figure 15:
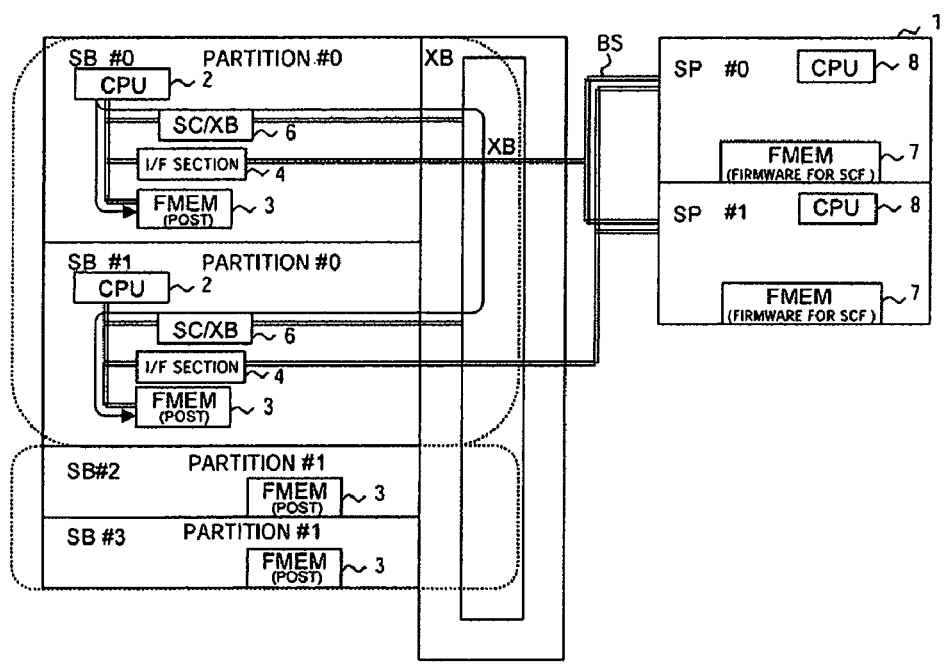
FIG. 15 is a block diagram showing a prior art.

FIG. 1 is a block diagram showing the entire configuration of a system according to an embodiment of the present invention, and FIG. 2 is a block diagram showing the main part of an SP constituting a POST management apparatus according to the present invention. In FIG. 1, although the same reference numerals as those in FIG. 15 denote the same or corresponding parts as those in FIG. 15, the arrangement and usage pattern of the parts differ between the configurations of FIGS. 1 and 15.

The FMEM 3 in each of the SB #0 and SB #1 is connected to the I/F section 4 and can directly be accessed from the SP 1A. At the same time, as in the case of the conventional configuration, the I/F section 4 and FMEM 3 are directly connected to each other and, therefore, the FMEM 3 can directly be accessed from the CPU 2.

With the above configuration, read/write operation can be performed unconditionally from the SP 1A to the FMEMs 3 in the SB #0 and SB #1.

Further, in each of the SB #0 and SB #1, an FRU ROM 5 in which individual information such as a serial number of each unit is provided at a location accessible from the SP 1A on the SB unit so that the SP 1A can acquire the individual information.

The SP 1A includes an FMEM 9 for registering a POST for update. Further, the SP 1A includes a storage section (e.g., a part of the area of the FMEM 9) for temporarily storing the POST acquired from a predetermined SB as described later.

With the above configuration, in the present embodiment, read/write operation can directly be performed from the side of the SP (control service processor) to the FMEM in which the POST (resource working under the CPU of each SB) under the control of the control service processor without the need of communication between the CPU of each SB and SP 1A. Further, the path used for read/write operation can be utilized for update of the POST.

In addition, update processing for a plurality of FMEMs can be performed in parallel from the SP in a broadcast manner. Further, since the FRU ROM storing the unique information is provided in each SB (including the FMEM) which is a subject for replacement, the SP can grasp the individual information of the SB by reading out the individual information from the SP, thereby facilitating automation of maintenance operation as described later.

FIG. 2 is a block diagram showing the functions described above. The SP 1A includes an access section 11 configured to access the FMEM 3 of the SB and FRU ROM 5 for read/write operation, an individual information acquisition section 12 configured to acquire the individual information from the access section 11, a version number information recognition section 13 configured to acquire and recognize version number information, a failure information acquisition section 14 configured to acquire failure information, a version number management section 10 configured to manage the version number of the POST of each SB based on the information from each section, a registration section 15 (FMEM 9) configured to register a POST for update, a scheduler 16 configured to manage the update time on a partition-by-partition basis, and a temporary storage section 17 configured to temporarily store a POST acquired from the SB. The version number management section 10 includes a storage section for storing the individual information of each SB and the version number information of the POST of each SB.

Version number management operation procedures (automatic update of the version number of a power-on self test program (POST)) in various situations will be described individually below.

(Initial Registration Time)

Figure 3:
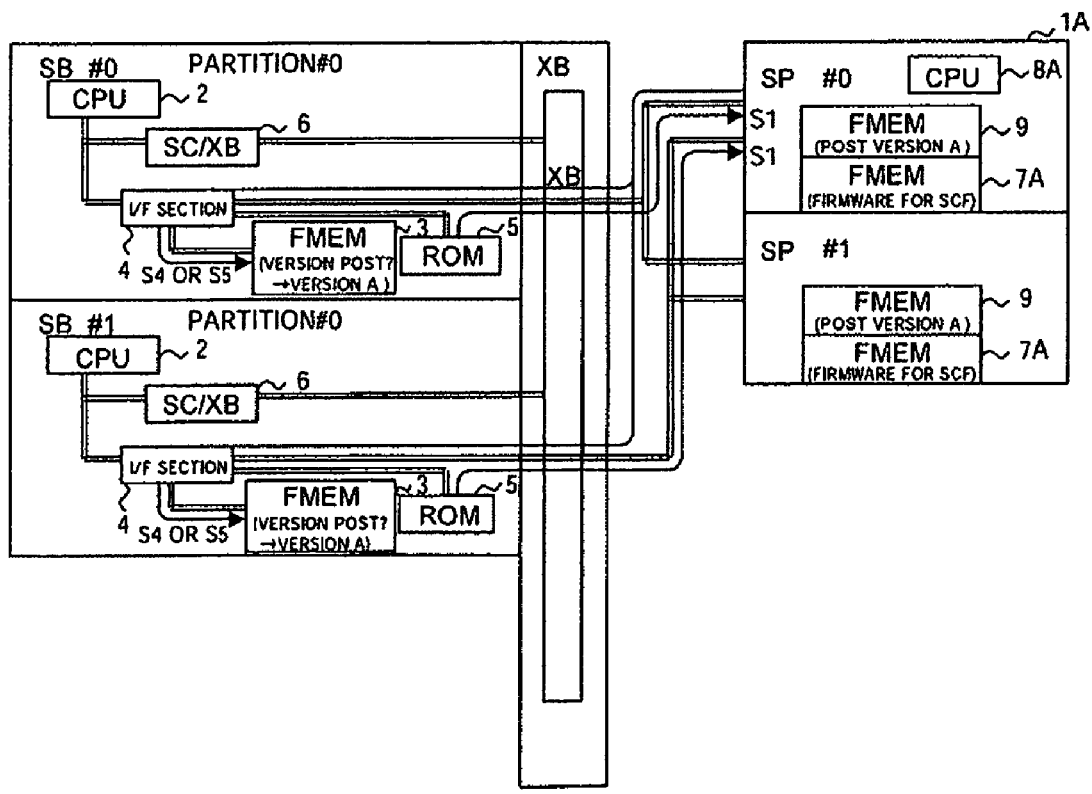
FIG. 3 is a block diagram showing an example of a state of the system at initial registration time.
Figure 4:
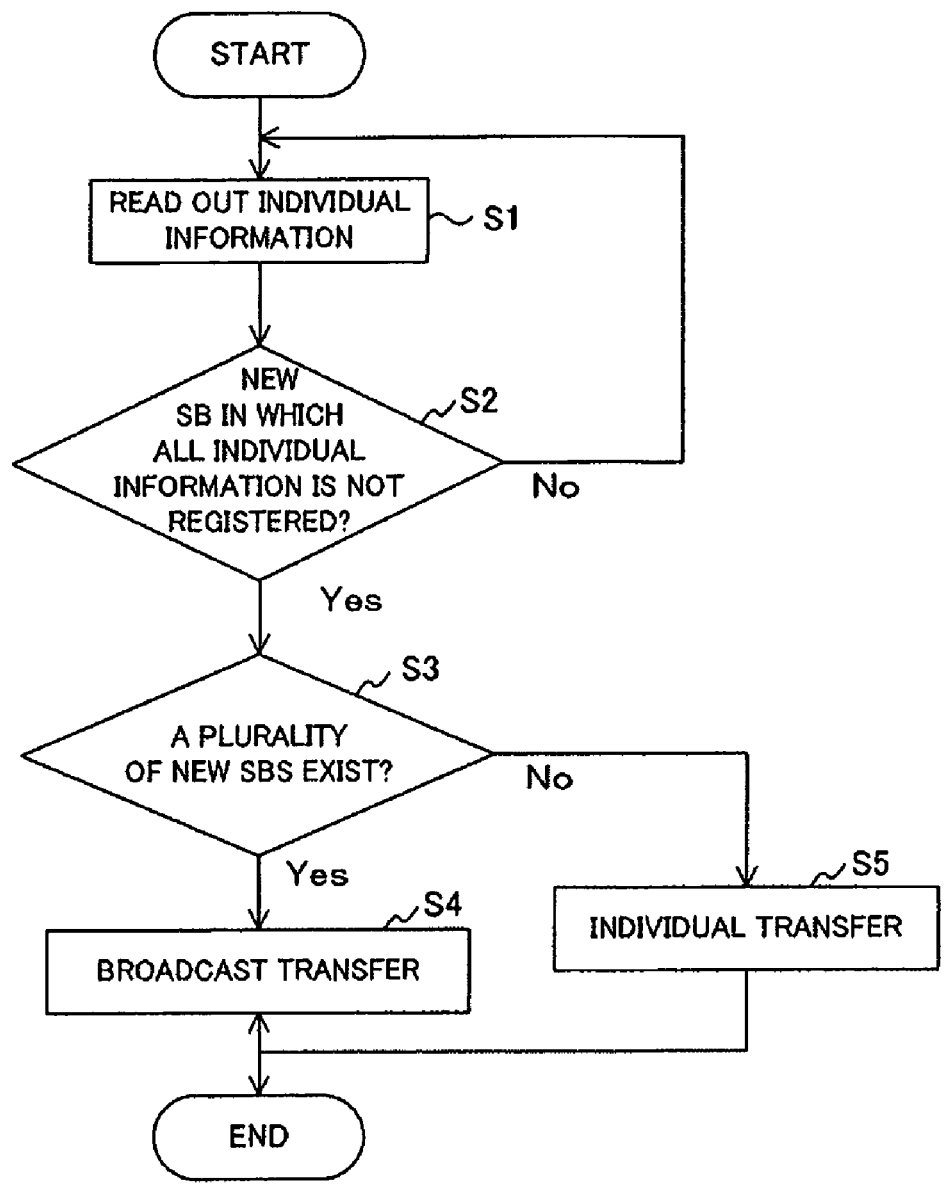
FIG. 4 is a flowchart explaining operation at the initial registration time.

The management operation procedure at initial registration time will be described with reference to the flowchart of FIG. 4 as shown in FIG. 3. In the following description, it is assumed that one partition #0 is constituted by SB #0 and SB #1 as shown in FIG. 3.

The version number management section 10 of the SP (hereinafter, referred to merely as SP) reads out the individual information from the FRU ROM 5 of each SB (step S1). When recognizing a new SB in which all the read out individual information are not registered (Yes in step S2), the SP determines execution of the initial registration processing and then determines whether or not there exist a plurality of such SBs (step S3). When determining a plurality of such SBs exist (Yes in step S3), the SP transfers a POST (version A) registered therein to the FMEMs 3 of a plurality of such SBs at the same time in a broadcast manner (step S4). When determining that there is only one such SB (No in step S3), the SP transfers a POST (version A) registered therein only to the FMEM 3 of the one SB (step S5).

(Addition Time of New SB: in the Case where Addition is Made at Normal Operation Time)

Figure 5:
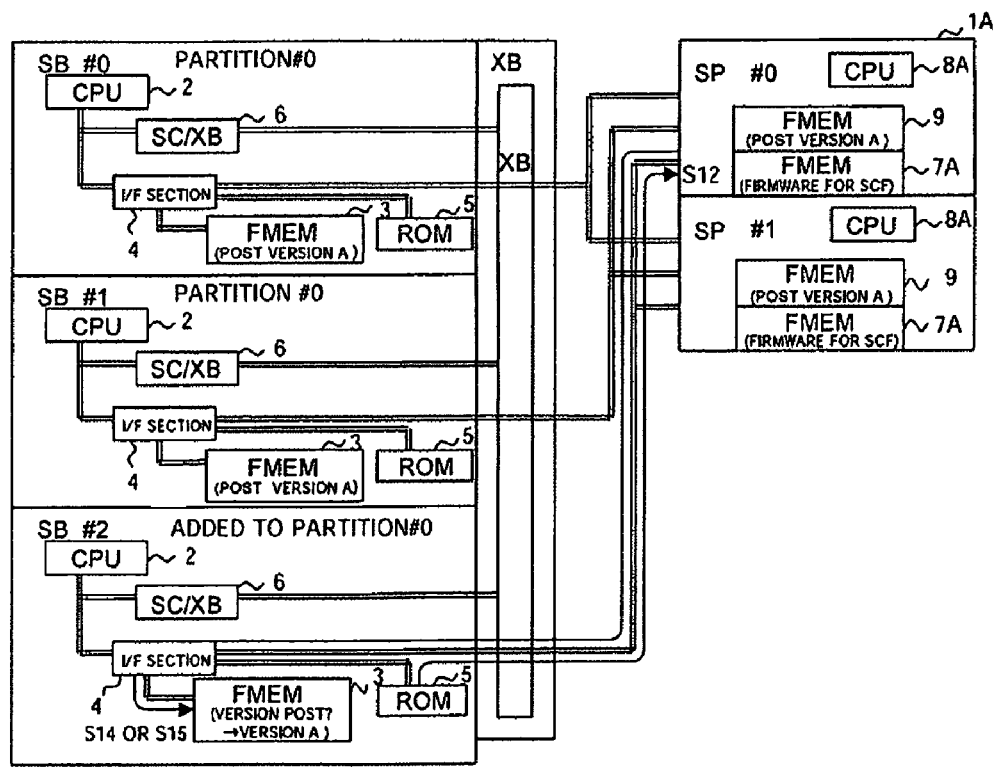
FIG. 5 is a block diagram showing an example of a state of the system when a new SB is installed.
Figure 6:
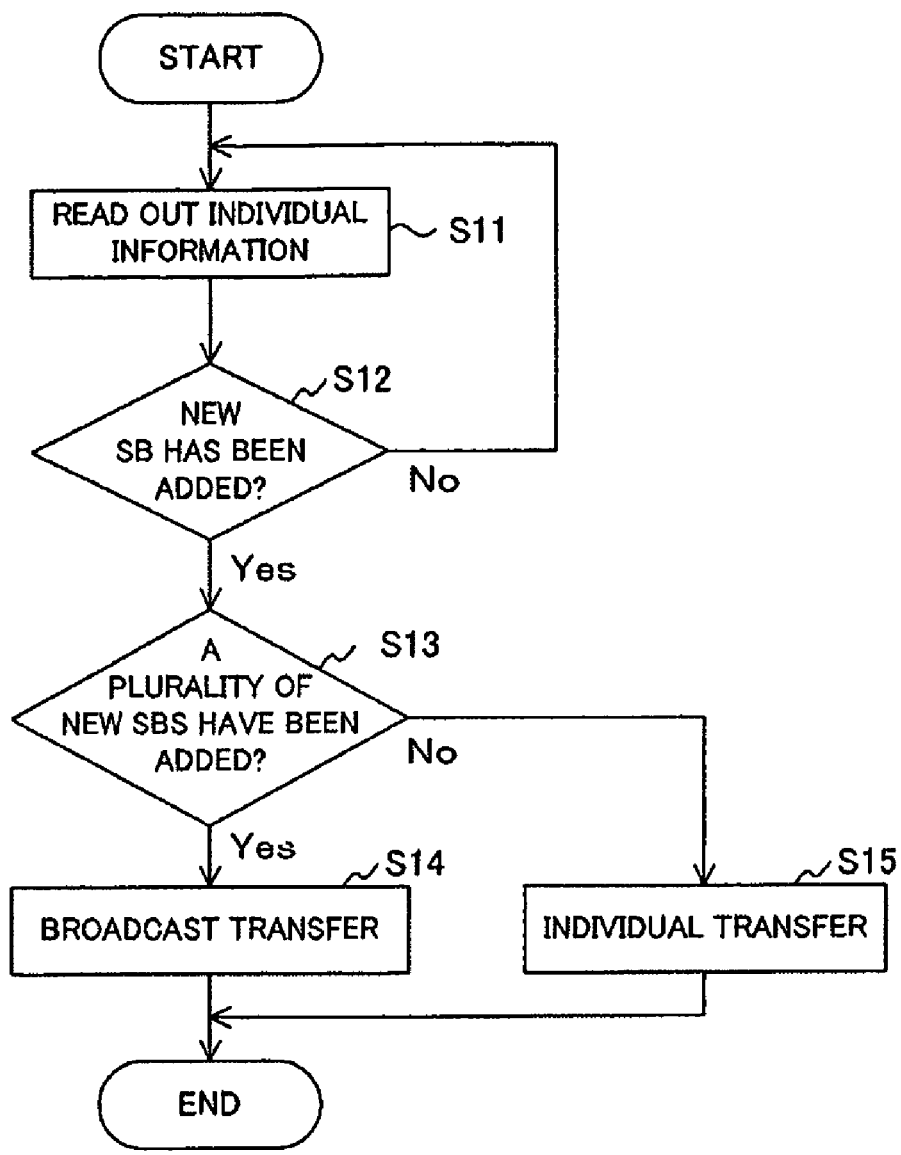
FIG. 6 is a flowchart explaining operation when a new SB is installed.

The operation of adding a new SB at normal operation time will be described below with reference to the flowchart of FIG. 6. In the following description, it is assumed that an SB #2 is newly added to the partition #0 constituted by the SB #0 and SB #1 which are in operation as shown in FIG. 5.

When the SB #2 is added to the partition #0 by an operator, the SP recognizes the connection of the SB #2 and acquires the individual information from the FRU ROM of the newly added SB unit (step S11). The SP recognizes the connection of a new SB that is not registered therein based on the individual information read out from the FRU ROM and determines the addition of a new SB (Yes in step S12). When determining that a plurality of such SBs exist (Yes in step S13), the SP transfers a POST (version A) registered therein to the FMEMs 3 of a plurality of such SBs at the same time in a broadcast manner (step S14). When determining that there is only one such SB (No in step S13), the SP transfers a POST (version A) registered therein only to the FMEM of the one SB (step S15).

(Addition Time of New SB: in the Case where Addition is Made after the POST is Updated During Operation Time)

Figure 7:
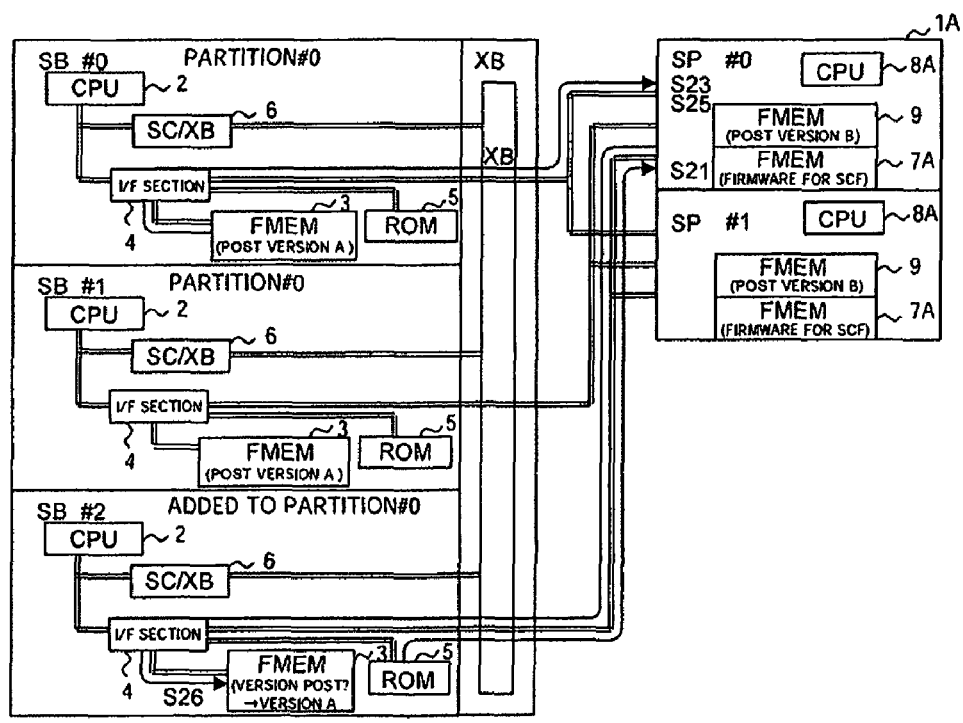
FIG. 7 is a block diagram showing another example of a state of the system when a new SB is installed.
Figure 8:
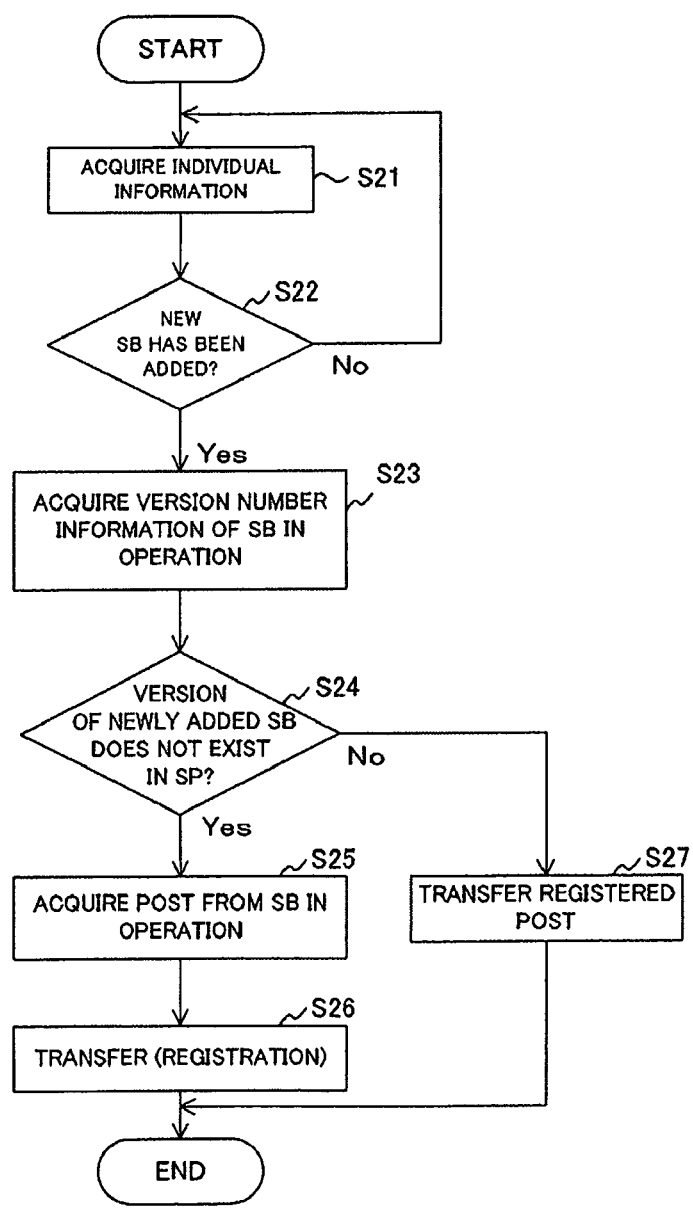
FIG. 8 is a flowchart explaining another example of operation when a new SB is installed.

The operation of newly adding an SB after the POST of the SP is updated during operation time of the partition will be described below with reference to the flowchart of FIG. 8. In the following description, as shown in FIG. 7, it is assumed that an SB #2 is newly added to the partition #0 constituted by the SB #0 and SB #1 which are in operation.

When the SB #2 is added to the partition #0 by an operator, the SP recognizes the connection of the SB #2 and acquires the individual information from the FRU ROM of the newly added SB unit (step S21). The SP recognizes the connection of a new SB that is not registered therein based on the individual information read out from the FRU ROM (Yes in step S22), and acquires the version number information of in-operation SBs in the same partition as that of the newly added SB (step S23). The version number information may be one that is managed in the version number management section 10 of the SP.

When recognizing that the POSTs of the SB #0 and SB #1 which are in operation are both version A and that the version number of the POST has been updated from the version A to version B in the SP and therefore the version A does not exist in the FMEM 9 of the SP (Yes in step S24), the SP reads out the POST of the version A from the in-operation SB (e.g., SB #0) of the partition #0 (step S25).

Then, the SP registers the POST of version A which is in operation in the partition #0 in the FMEM of the newly added SB #2 (step S26). The update of the POSTs in the partition #0 cannot be performed during the operation time of the partition #0, so that the SP performs the update of the POSTs to version B after the operation of the partition #0 is halted. In the case where a plurality of SBs have newly been added, the SB can transfer the POST of the version A at a time in a broadcast manner as in the above case for registration. In the case where version number of the POST has not been updated from the version A to version B in the SP (No in step S24), the SP transfers the POST of the version A to the newly added SB (step S27).

(Failure/Replacement Time)

Figure 9:
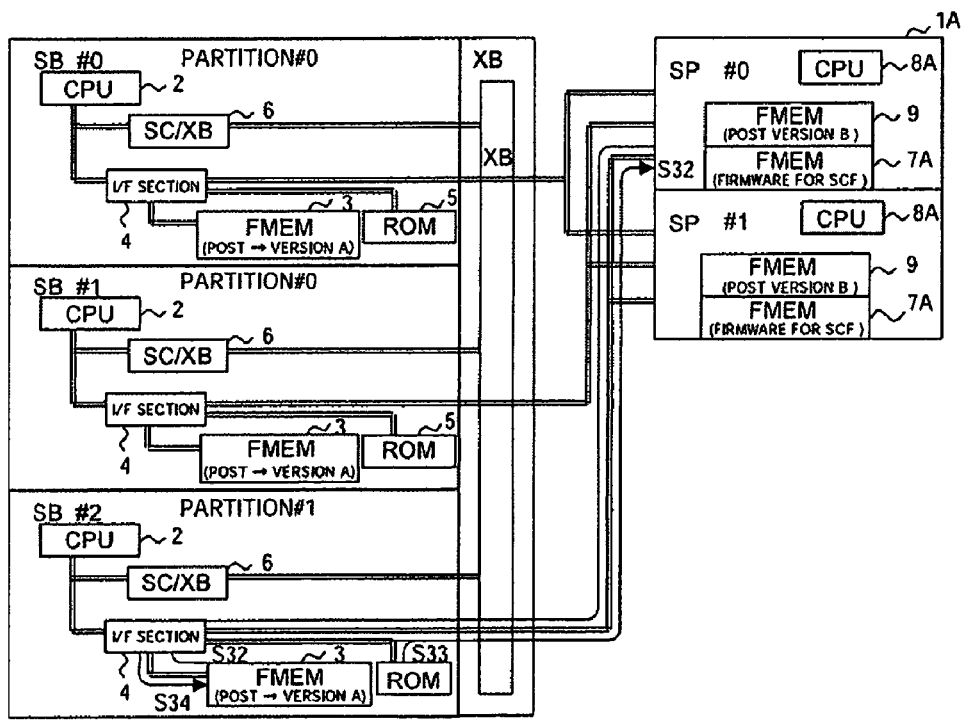
FIG. 9 is a block diagram showing an example of a state of the system when the SB is replaced with a new one due to a failure.
Figure 10:
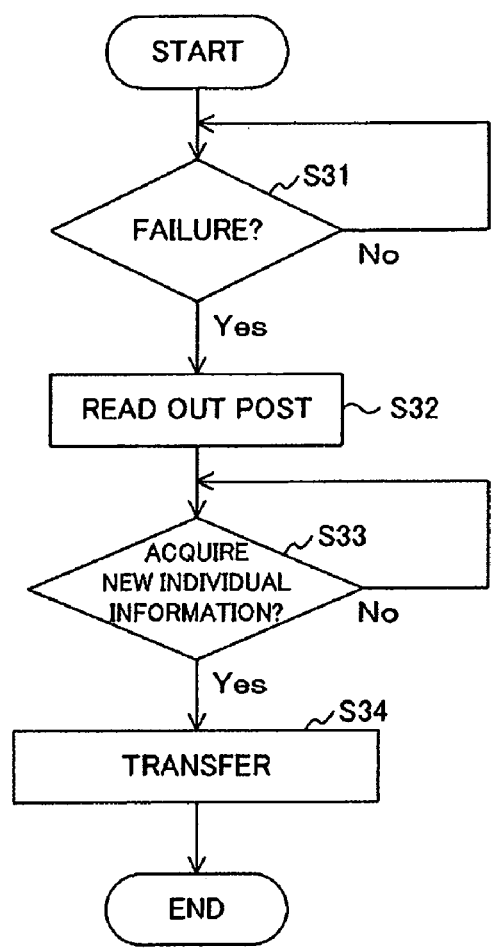
FIG. 10 is a flowchart showing an example of operation when the SB is replaced with a new one due to a failure.

In the case where a failure occurs in the SB, the failed SB needs to be booted up by the POST of the original version number that the SB used, i.e., by the POST of the version before the failure even if the version of the POST has been updated in the SP side. The operation of such failure/replacement time will be described with reference to the flowchart of FIG. 10. In the following description, it is assumed that the partition #0 is constituted by the SB #0 and SB #1 and that an SB #2 of a different partition #1 is replaced with new one due to occurrence of a failure, as shown in FIG. 9.

When detecting a failure of the SB #2 or receiving a replacement instruction from an operator (step S31), the SP reads out, before replacement, data of the version A from the FMEM of the SB #2 to be replaced and temporarily stores the data (step S32). After completion of the replacement of the SB through maintenance work, the SP recognizes connection of a new SB and reads out the individual information from the FRU ROM of the new SB unit. The SP then recognizes the connection of the new SB that is not registered therein (that is, the SB #2 has been replaced with a new SB) based on the read out individual information (Yes in step S33) and writes the temporarily stored POST of the version A in the FMEM of the new SB #2 (step S34).

(Update of Post from SP Side: at Partition Downtime)

Figure 11:
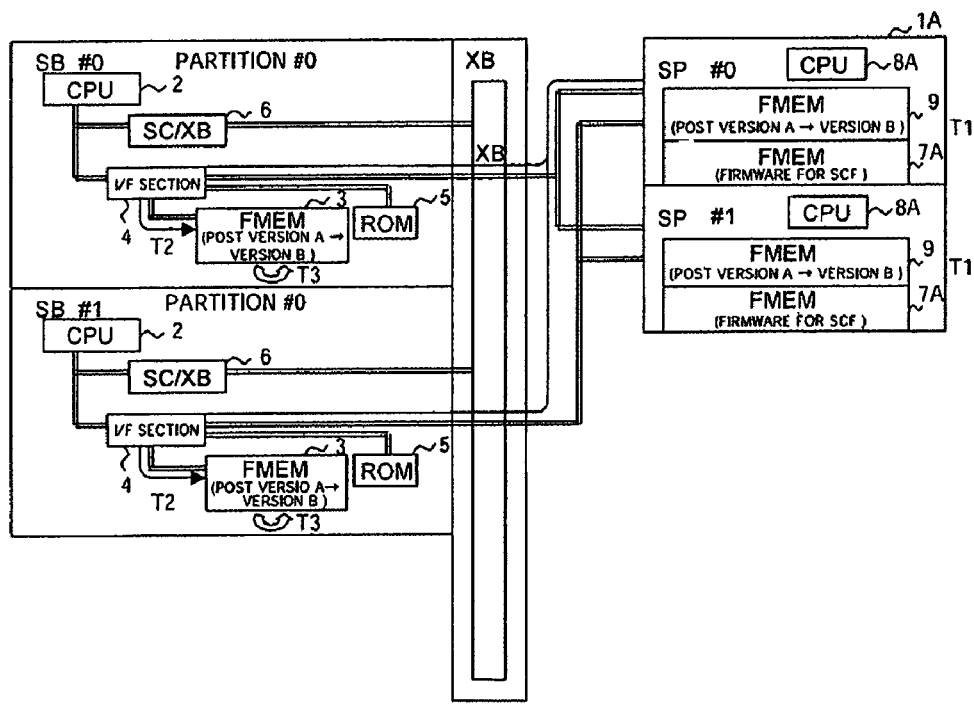
FIG. 11 is a block diagram showing an example of a state of the system when the POST is updated at the partition downtime.

The operation in which the POST of each SB is updated from the SP side at the partition downtime will be described. In the following description, it is assumed that one partition #0 is constituted by the SB #0 and SB #1 as shown in FIG. 11.

First, the version number of the POST registered in the FMEM of the SP is updated from the version A to version B (T1). This update is made through maintenance work by manual operation. After completion of the update in the SP, the SP transfer the updated POST data to a not shown ROM or a storage area for update in the FMEM of each SB (T2) and updates the version number registered in the FMEM 3 on each SB from the version A to version B at the next partition boot time (T3).

(Update of POST from SP Side: at Partition Operation Time)

Figure 12:
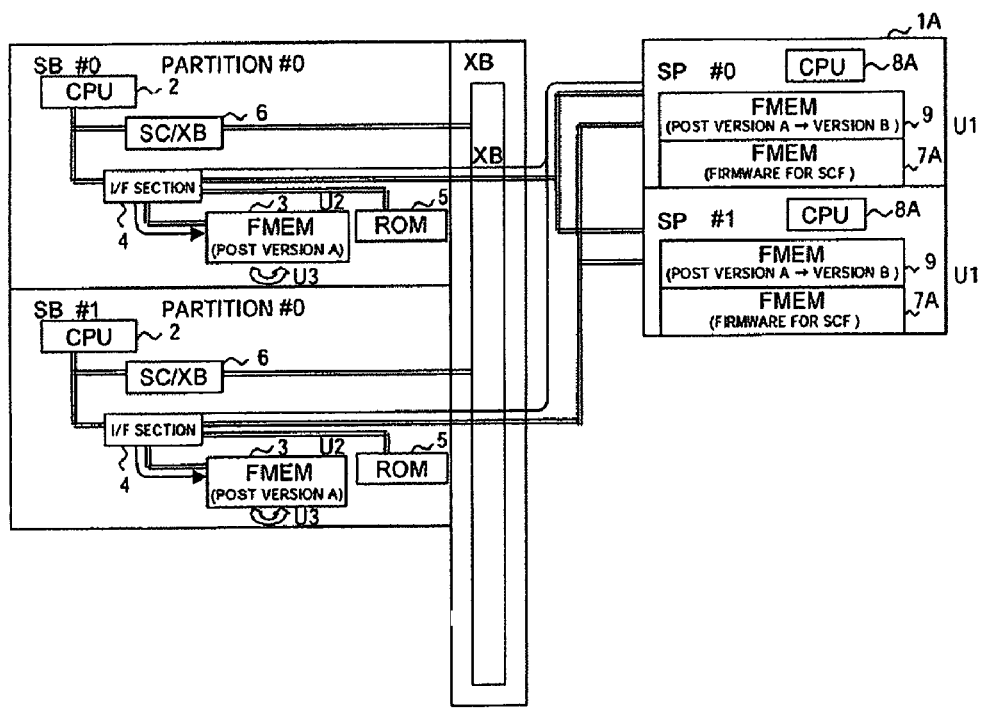
FIG. 12 is a block diagram showing an example of a state of the system when the POST is updated at the partition operation time.

The operation in which the POST of each SB is updated from the SP side at the partition operation time will be described. In the following description, it is assumed that one partition #0 is constituted by the SB #0 and SB #1 as shown in FIG. 12.

First, the version number of the POST registered in the FMEM of the SP is updated from the version A to version B (U1). This update is made through maintenance work by manual operation. After completion of the update in the SP, the SP transfers the updated POST data to a not shown ROM or a storage area for update in the FMEM 3 of each SB (U2) and updates the version number registered in the FMEM 3 on each SB from the version A to version B at the partition reboot time (U3). Since the partition is in operation, the registration of the version B in the FMEM on each SB is made after the reboot of the partition.

(Automatic Update of a Plurality of Partitions)

Figure 13:
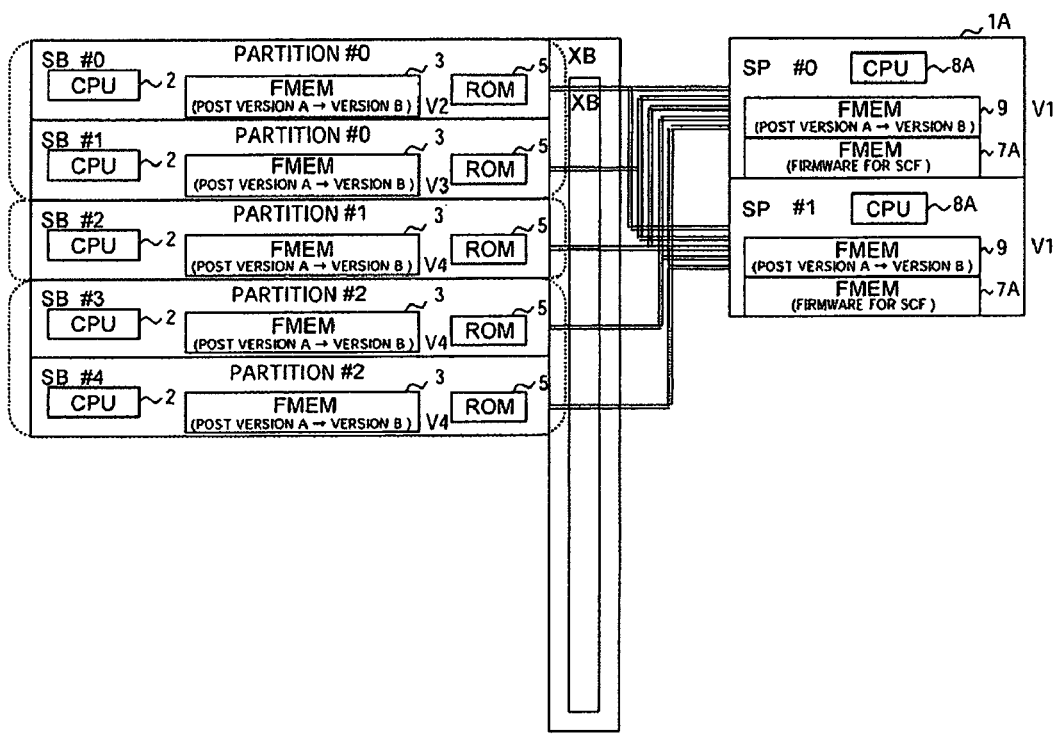
FIG. 13 is a block diagram showing an example of a state of the system when an update process is performed based on a scheduler.

The update operation of a plurality of partitions will be described using a configuration of FIG. 13 where a plurality of partitions are provided as an example.

There are three partitions of #0 to #2. The partition #0 serves as a first database managed by an operator X and is configured to operate 24 hours a day on weekdays. The partition #1 serves as a server managed by the operator X and is configured to operate at all times. The downtime of the partition #1 is determined systematically. The partition #2 serves as a second database managed by an operator Y and is configured to operate from 9:00 to 17:00 all days of the week.

In the system having such a configuration, first the POST registered in the FMEM of the SP is updated from the version A to version B. This update is made through maintenance work or the like.

For the partition #0, the SP automatically performs update to the version B on the first weekend day following the update in the SP (V2). For the partition #1, the SP automatically performs update to the version B at the time when the operation of the partition #1 is systematically halted for the first time after the update in the SP under schedule management (V3). For the partition #2, the SP automatically performs update to the version B at the time when the operation of the partition #2 is halted for the first time after the update in the SP (V4). The abovementioned operations can be performed in combination by cooperation between the version number management section 10 and scheduler 16.

(Automatic Update in the Case where a Plurality of Partitions are in Operation Under POSTS of Different Versions)

Figure 14:
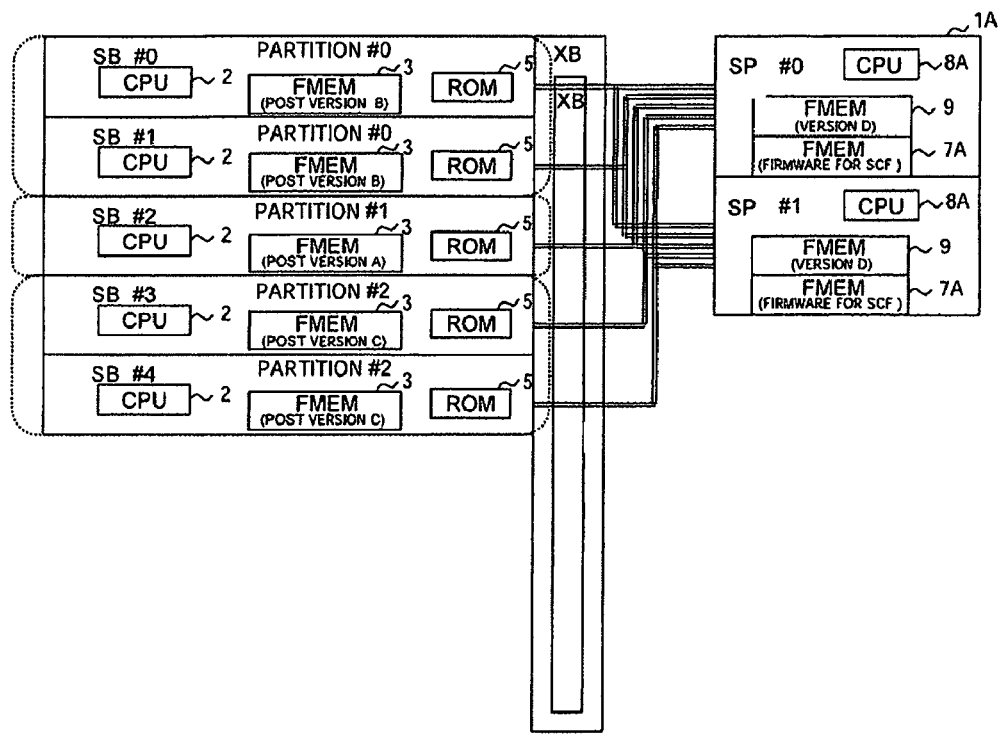
FIG. 14 is a block diagram showing an example of a state of the system when a plurality of partitions are updated.

As shown in FIG. 14, there may be case where the version numbers of a plurality of partitions differ from one another depending on the POST update timing in the SR. In such a case, the SP reads out data of the POST from one managed SB and transfers the acquired data to the SB in need. This eliminates the need for the SP to have POST data of a plurality of generations (versions) for addition of the SB to the partition or SB maintenance work. The operation in this case is similar to the operation shown in FIGS. 7 and 8, and the description thereof is omitted here.

By storing the steps shown in the above respective flowcharts as a POST management program in a computer-readable storage medium, it is possible to allow a computer to execute a POST management method. The computer-readable medium mentioned here includes: a portable storage medium such as a CD-ROM, a flexible disk, a DVD disk, a magneto-optical disk, or an IC card; a database that holds computer program; and another computer and database thereof.

According to the exemplary embodiment of the present invention described in detail, the following advantages can be obtained:
(1) The POST management apparatus (SP: control service processor) determines the necessity of POST update based on the individual information and, when determining that the POST update is necessary, the SP can automatically perform the update when the opportunity comes.
(2) In the case of at replacement time of SB or partition downtime, power-on operation only for the update to become effective is unnecessary.
(3) The time period during which the partition is out of operation due to execution of the update can be reduced.
(4) There is no need of being conscious about the version number of a POST of the SB to be added at SB replacement time.
(5) In a multi-partition system, a case where POSTs of a plurality of generations exist together in one apparatus depending on the update timing. However, the SP reads out the POST of a required version number from a given partition in operation, so that it is possible to eliminate the need for the SP to have POST data of old version numbers.

INDUSTRIAL APPLICABILITY

According to the present invention, it is possible to provide a POST management apparatus and its management method and program, allowing quick and easy replacement work of a POST and easy management of the POST.

The invention claimed is:

1. A power-on self test program management apparatus for managing a power-on self test program of a system board in a partition which operates in units of OS using a CPU of the system board as a resource, comprising:
an access unit that can access storage area storing the power-on self test program of the system board to perform read/write operation;
an individual information acquisition unit that acquires individual information of the system board provided in the partition;
a version number information recognition unit that recognizes version number information of the power-on self test program used in the partition; and
a version number management unit that transfers a power-on self test program of a predetermined version number to the storage area of the system board accessed by the access unit according to at least one of the individual information acquired by the individual information acquisition unit and version number information recognized by the version number information recognition unit and manages the version number of the power-on self test program so that the version numbers of the power-on self test programs used in the system boards in units of a partition coincide with each other, wherein
the version number management unit determines addition of a new system board based on the individual information acquired by the individual information acquisition unit and, when determining that the version number of the power-on self test program used in the partition to which the new system board is to be added is different from the version number of the power-on self test program registered in the version number management unit itself based on the version number information recognized by the version number information recognition unit, causes the access unit to read out the power-on self test program stored in the storage area of the existing system board and transfers the read out power-on self test program to the new system board.

2. The power-on self test program management apparatus according to claim 1, comprising a registration unit that performs registration of the power-on self test program, wherein
when the version number management unit determines execution of initial registration processing for the system board constituting the partition based on the individual information acquired by the individual information acquisition unit, it transfers the power-on self test program for update registered in the registration unit to the storage area of the system board.

3. The power-on self test program management apparatus according to claim 1, comprising a failure information acquisition unit that acquires the failure information indicating that a failure occurs in a given system board, wherein
the version number management unit causes the access unit to read out the power-on self test program from a failed system board based on the failure information acquired by the failure information acquisition unit and individual information acquired by the individual information acquisition unit and transfers the read out power-on self test program to a new system board with which the failed system board has been replaced.

4. The power-on self test program management apparatus according to claim 1, wherein
the version number management unit manages the downtime of a plurality of partitions and performs update of the power-on self test programs used in the system boards of the respective partitions at the partition downtime.

5. The power-on self test program management apparatus according to claim 1, wherein
when the version number management unit determines that there are a plurality of system boards to which the power-on self test program is to be transferred based on the individual information acquired by the individual information acquisition unit, it transfers the power-on self test program in a broadcast manner.

6. A power-on self test program management method for managing, by using a computer, a power-on self test program of a system board in a partition which operates in units of OS using a CPU of the system board as a resource, the method comprising:
accessing storage area storing the power-on self test program of the system board to perform read/write operation;
acquiring individual information of the system board provided in the partition;
recognizing version number information of the power-on self test program used in the partition; and
transferring a power-on self test program of a predetermined version number to the storage area of the system board accessed in the access step according to at least one of the individual information acquired in the individual information acquisition step and version number information recognized in the version number information recognition step and manages the version number of the power-on self test program so that the version numbers of the power-on self test programs used in the system boards in units of a partition coincide with each other, wherein
the version number management step determines addition of a new system board based on the individual information acquired in the individual information acquisition step and, when determining that the version number of the power-on self test program used in the partition to which the new system board is to be added is different from the version number of the power-on self test program registered in the version number management step based on the version number information recognized in the version number information recognition step, the access step reads out the power-on self test program stored in the storage area of the existing system board and the version number management step transfers the read out power-on self test program to the new system board.

7. The power-on self test program management method according to claim 6, further comprising the step of registering performs registration of the power-on self test program, wherein
when the version number management step determines execution of initial registration processing for the system board constituting the partition based on the individual information acquired in the individual information acquisition step, it transfers the power-on self test program for update registered in the registration step to the storage area of the system board.

8. The power-on self test program management method according to claim 6, comprising a failure information acquisition step that acquires the failure information indicating that a failure occurs in a given system board, wherein
the version number management step causes the access unit to read out the power-on self test program from a failed system board based on the failure information acquired in the failure information acquisition step and individual information acquired in the individual information acquisition step and transfers the read out power-on self test program to a new system board with which the failed system board has been replaced.

9. The power-on self test program management method according to claim 6, wherein
the version number management step manages the downtime of a plurality of partitions and performs update of the power-on self test programs used in the system boards of the respective partitions at the partition downtime.

10. The power-on self test program management method according to claim 6, wherein
when the version number management step determines that there are a plurality of system boards to which the power-on self test program is to be transferred based on the individual information acquired in the individual information acquisition step, it transfers the power-on self test program in a broadcast manner.

11. A non-transitory computer-readable recording medium storing a management program to manage a power-on self test program, the management program causing the computer to execute:
accessing storage area storing the power-on self test program of the system board to perform read/write operation;
acquiring individual information of the system board provided in the partition;
recognizing version number information of the power-on self test program used in the partition; and
transferring a power-on self test program of a predetermined version number to the storage area of the system board accessed in the access step according to at least one of the individual information acquired in the individual information acquisition step and version number information recognized in the version number information recognition step and manages the version number of the power-on self test program so that the version numbers of the power-on self test programs used in the system boards in units of a partition coincide with each other, wherein
the version number management step determines addition of a new system board based on the individual information acquired in the individual information acquisition step and, when determining that the version number of the power-on self test program used in the partition to which the new system board is to be added is different from the version number of the power-on self test program registered in the version number management step based on the version number information recognized in the version number information recognition step, the access step reads out the power-on self test program stored in the storage area of the existing system board and the version number management step transfers the read out power-on self test program to the new system board.

12. The medium according to claim 11, wherein
when the version number management step determines execution of initial registration processing for the system board constituting the partition based on the individual information acquired in the individual information acquisition step, it allows the computer to execute transfers the power-on self test program for update registered in the registration step to the storage area of the system board.

13. The medium according to claim 11, wherein
the version number management step causes the access unit to read out the power-on self test program from a failed system board based on the failure information acquired in the failure information acquisition step and individual information acquired in the individual information acquisition step and transfers the read out power-on self test program to a new system board with which the failed system board has been replaced.

14. The medium according to claim 11, wherein
the version number management step manages the downtime of a plurality of partitions and performs update of the power-on self test programs used in the system boards of the respective partitions at the partition downtime.

15. The medium according to claim 11, wherein
when the version number management step determines that there are a plurality of system boards to which the power-on self test program is to be transferred based on the individual information acquired in the individual information acquisition step, it transfers the power-on self test program in a broadcast manner.

\* \* \* \* \*